2,904,298

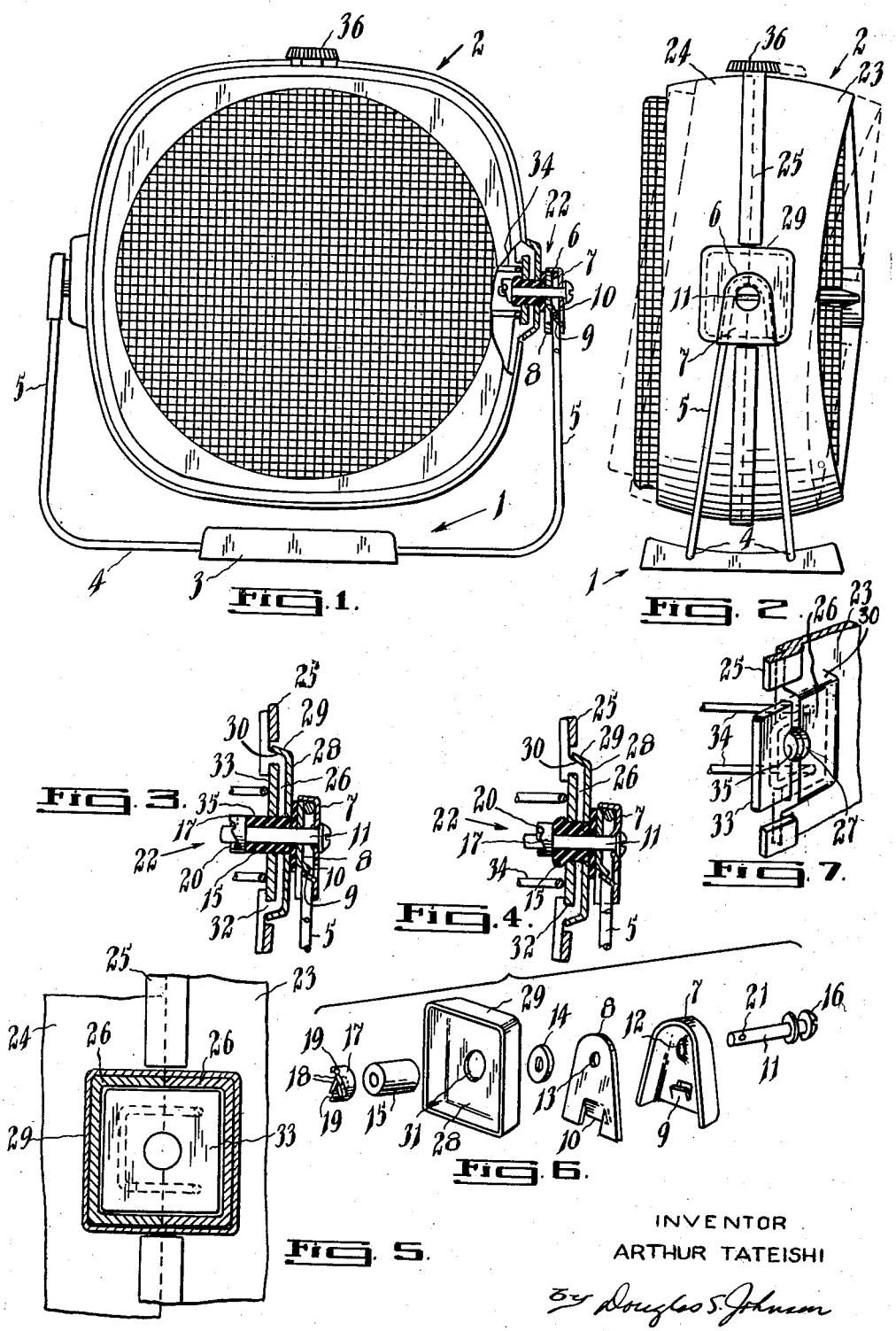

MOUNTING FOR A FAN ASSEMBLY OR THE LIKE

Arthur Tateishi, Toronto, Ontario, Canada

Application June 11, 1954, Serial No. 436,151

1 Claim. (Cl. 248—127)

This invention relates to a novel and improved means of supporting a housing, frame, or other member in a removable manner for tilt adjustment and one of the important objects of the invention is to enable a housing or other member to be instantly connected to or removed from the support means and tilted to and retained in any desired angle of tilt.

Another important object of the invention is to provide a support means as aforesaid which will provide a means of locking the components of a demountable housing or frame in assembled relation at the same time that it releasably locks the housing in supported position for tilt adjustment.

In this connection it is a further important object to provide a novel composite casing formation for co-operation with the support means whereby both the assembly and support of the casing can be effected without the employment of a single fastening element other than the support means.

Again another object is to provide a support means as aforesaid adapted for co-operation with a support house structure to carry the load of a unit housed within the casing whereby the casing may be made of light weight construction to serve essentially as an enclosure for the units to be assembled and locked in enclosing relation by the support means coincidental with the assumption of the load of the unit by the support means.

According to the preferred form of the invention the support means comprises a standard or base from which extend two spaced arms carrying generally cylindrical, axially aligned, expansible pivot and fastening elements adapted to be readily introduced through orifices in the frame, housing, or other member to be supported and then to be expanded to lock the pivot elements in position against removal from the orifices and to cause the pivot elements to grip the walls of the orifices with sufficient friction to retain the housing in adjusted positions to which same may be turned about the support axis constituted by the pivot elements.

A further important feature resides in constituting the member to be supported as a casing formed of two mating and interlocking half sections and providing co-operating boss portions on the sections which when mated define the orifices through which the pivot or fastening element are adapted to extend, and providing rings or ported caps to encircle the co-operating boss portions to hold same in orifice forming relation and through which the pivot and fastening elements extend, the pivot elements locking the caps in assembled relation on the boss portion while simultaneously gripping the walls of the orifices formed by the boss portions to lock the caps to the casing sections and the casing sections in assembled tiltably supported relation.

Again a further feature resides in forming the casing boss portions and caps with co-operating cam surfaces whereby the pivot or fastening elements in drawing the boss portion and caps into assembled relation draws the casing sections into tightly assembled relation.

A still further feature resides in employing the pivot or fastening elements as resilient shock mounting means for a support structure arranged within and extending transversely of the casing to assume the weight of a unit mounted on the transverse support structure enabling a light weight casing to be employed as a casing serving essentially as an enclosure as aforementioned.

These and other objects and features will become apparent from the following description taken in conjunction with the accompanied drawings, in which, Figure 1 is a part elevational view, part vertical sectional view illustrating a support structure constructed in accordance with the invention and illustrating its application to support and retain a housing in assembled relation.

Figure 2 is an end elevational view of the support structure of Figure 1 showing the tilt adjustment of the housing.

Figure 3 is an enlarged fragmentary mid-vertical sectional view of the pivotal connection between the support structure and the housing with the expansible pivot in its unexpanded position.

Figure 4 is a view similar to Figure 3 and showing the expansible pivot element expanded.

Figure 5 is a fragmentary vertical sectional detail taken at right angles to Figures 3 and 4 through the bearing boss portions of the housing sections, with the pivot element removed therefrom.

Figure 6 is an exploded perspective view illustrating the pivot assembly and the housing retaining cap.

Figure 7 is a fragmentary perspective view showing one of the housing or casing sections and its boss portion forming a pocket for the reception of the end mount of a transverse support structure arranged within the housing.

For purposes of illustrating the invention the support structure generally designated at 1 is shown employed to support a casing generally designated at 2 which may form the housing, for instance, of a fan of the type shown in my United States Patent, No. 2,768,782, issued October 30, 1956.

It will be understood however that the particular formation of the casing will vary according to the unit or structure to be housed by the casing.

In the embodiment of the invention illustrated the support structure 1 comprises a central base 3 from which extend outwardly and upwardly turned rod-like members 4 to define spaced upwardly extending arms 5. The rod-like member 4 at each end of the base 3 forming the arm 5 at the respective base end comprises a continuous rod doubled upon itself and having its upturned reaches constituting the arm 5 of generally V shape joined at the upper end of the arm in a rounded apex 6, as best shown in Figure 2.

Mounted on the apex 6 of each of the arms 5 is a generally V-shaped cap 7 having an open face at the inside of the arm 5. A generally V-shaped plate 8 closes the open face or side of the cap to enclose the arm apex 6.

The cap 7 and plate 8 are formed with interfitting laterally turned lug projections 9 and 10 respectively to hold the lower ends of the cap and plate in spaced relation, while the upper ends are maintained in spaced relation by the arm apex 6 to constitute the plate 8 a bearing plate, as hereinafter more fully explained.

Carried by the arm assembly or housing constituted by the cap 7 and plate 8 at the apex of each arm 5 is a pivot and fastening element generally designated at 22 preferably of the type sold under the trade mark "Vibrex" and comprising a central stud 11 inserted through orifices 12 and 13 in the cap 7 and plate respectively and carrying a cushion or gasket member 14 in contact with the bearing surface constituted by the plate 8. Also mounted on the stud 11 is a resilient sleeve 15 of rubber or like material which can be compressed longitudinally of the stud and thereby expanded radially of the stud.

Mounted at the opposite end of the stud 11 from the head 16 is a cam 17 formed with a sloping cam surface 18 and a locking notch 19, the cam surface and locking notch being reproduced on opposite sides of a diameter of the cam to provide a balanced action. A pin 20 introduced through an orifice 21 in the stud 11 is arranged to operate against the cam surfaces 18 and into the locking notches 19 to effect the longitudinal compression and radial expansion of the sleeve 15.

By mounting the fastener elements 22 in axially aligned relation on the arms 5 these fasteners constitute expansible pivots to support a member for rotation about the axes of the studs 11 while enabling the member on expansion of the pivots to be frictionally locked in adjusted angular positions relative to the base 3, as hereinafter more fully explained.

In the embodiment of the invention shown the casing 2 comprises two mating sections 23 and 24, the section 24 having an offset overlap flange member 25 to assist in the assembly of the casing sections or components. The sections 23 and 24 are formed at opposite sides thereof with co-operating boss portions 26 having in the contiguous or abutting edges thereof semi-cylindrical recesses 27 to define therebetween an orifice for the reception of the pivot and fastening element 22.

To maintain the casing sections in assembled relation a cap member 28, having a peripheral flange 29 encircling the peripheral surface 30 of the boss portions 26, is provided. The cap is also formed with an orifice 31 to receive the pivot and fastening element 22 therethrough, and preferably the peripheral surfaces 30 of the boss portions 26 of the casing sections, and the flange 29 form sloping cam surfaces acting on forcing of the cap onto the boss portions to draw the casing sections 23 and 24 into tightly assembled relation. Preferably the boss portions 26 are constituted to define pockets 32 for the reception of an end plate or mount 33 arranged at each end of a transverse support structure extending transversely of the housing or casing 2 and designated at 34.

The plate or end mount at each end of the transverse support structure 24 is also provided with an orifice 35 to align with the orifices 27 and 31 for the reception of the pivot and fastening element 22 at each side of the casing.

By the provision of the transverse support frame or structure 34 and the end mounts 33 the load carried by the support structure 34 can be assumed by the pivot and fastening elements 22 and hence carried back to the base 3 through the arms 5. In this way the load of a unit mounted within the casing and, for instance, controlled through the knob 36 can be carried by the base and a relatively light weight casing can be employed, the principal function of which is to form an enclosure for the unit within the casing rather than constitute the main structural supporting element.

The action of the pivot and fastening elements 22, both to support the casing in shock mounted means and for adjustable angular movement, and to lock the casing in assembled relation, will be best understood with reference to Figures 3 and 4. By assembling the casing to bring the sections 23 and 24 into casing-forming relation and the boss portions 26 into orifice-forming co-operative relation, the cap members 28 can be applied, one at each side of the casing to ring or surround the boss portions 26, with the orifices 27 and 30 in axial alignment. Further, at the same time that the casing assembly is effected the end mounts 33 of the cross frame 34 can be assembled into oriented relation with respect to the casing within the pockets 32.

The fastening and pivot element at each side of the casing can then be introduced through the aligned orifices, including the orifice 35 of the end mount 33, and the stud 11 rotated to operate the pin 20 on the cam surfaces 18 of the cam 17 to compress the resilient sleeve 15 in a direction longitudinally of the stud while expanding the sleeve radially of the stud.

This action in the assembly illustrated has a dual effect. Due to the resistance to radial expansion offered by the walls of the orifices the sleeve 15 bulges over outside the plate or mount 33, forcing the plate, casing sections, boss portions 26 and cap member 28 axially of the stud 11 against the bearing surface afforded by the plate 8, or rather against the gasket or cushion member 14 interposed between the cap 28 and the plate 8 to urge the members 33, 23, 24 and 28 into tightly assembled relation. At the same time the radial expansion of the sleeve 15 in the orifices of the last-mentioned members serves to frictionally bind the periphery of the sleeve, with the peripheral surfaces of the orifices to frictionally bind the casing against rotative movement to maintain the casing in positions of angular adjustment relative to the base.

Preferably the arms 5 are spring-urged inwardly to introduce the pivot and fastening elements 22 into the casing and cap orifices, and the sleeves 15 of the fastening and pivot elements may be under light longitudinal compression to ensure that the cams 17 are held from rotation during rotation of the studs 11.

It will be appreciated that the assembly of the casing and locking of the fastening elements in casing-supporting relation may be instantly carried out, and the disassembly and removal may be effected with equal ease and rapidity.

It will be understood that the details disclosed herein are by way of illustrating an embodiment of the invention and not by way of limitation, and various changes and modifications may be made in the details thereof without departing from the scope of the appended claim.

What I claim my invention is:

A mounting for a fan-assembly or the like, comprising a support frame having a plate member at each side in substantially parallel relation, said plates having aligned openings therethrough, a housing comprising two mating sections each having raised co-operating boss portions at opposite sides with peripheral pocket formations inwardly thereof and presenting aligned openings centrally thereof, said support frame being adapted to be arranged within said housing and extending transversely thereof with its plate members registering in said peripheral pocket formations inwardly of said boss portions and with is respective plate opening in alignment with the boss portion openings, a base, a pair of spaced arms upstanding from said base, a pair of inwardly depending substantially aligned pivot pin formations carried by said arms, a resilient sleeve element for each of said pivot pin formations, means for compressing each of the sleeve elements towards its respective arm on rotation of its pin, said pivot pins and resilient sleeve elements being adapted to extend through the aforesaid aligned plate openings and boss portion openings at opposite sides of said housing and cap means for engaging over said boss portions carried by each of said pivot pins, each cap having a configuration corresponding to its boss formation and having a peripheral flange therearound, each cap and cooperating boss portions presenting cooperating camming surfaces whereby each cap is urged under compression of its resilient element to coact with its respective boss portions to urge the mating housing sections tightly together, said resilient sleeve elements upon being compressed, additionally frictionally binding said support frame and housing against rotational movement.

References Cited in the file of this patent

UNITED STATES PATENTS

| | | |
|---|---|---|
| 1,736,940 | Saives | Nov. 26, 1929 |
| 1,833,002 | Smith | Nov. 24, 1931 |
| 2,111,954 | Urbany | Mar. 22, 1938 |
| 2,123,448 | Weber | July 12, 1938 |
| 2,673,029 | Lautner | Mar. 23, 1954 |
| 2,688,894 | Modrey | Sept. 14, 1954 |
| 2,711,287 | Russell | June 21, 1955 |
| 2,768,782 | Tateishi | Oct. 30, 1956 |